United States Patent
Zakorzhevsky et al.

(10) Patent No.: US 9,348,998 B2
(45) Date of Patent: May 24, 2016

(54) SYSTEM AND METHODS FOR DETECTING HARMFUL FILES OF DIFFERENT FORMATS IN VIRTUAL ENVIRONMENTS

(71) Applicant: Kaspersky Lab ZAO, Moscow (RU)

(72) Inventors: Vyacheslav V. Zakorzhevsky, Moscow (RU); Evgeny A. Aseev, Moscow (RU); Andrey V. Krukov, Moscow (RU); Anton M. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/641,609

(22) Filed: Mar. 9, 2015

(65) Prior Publication Data
US 2015/0356291 A1    Dec. 10, 2015

Related U.S. Application Data

(63) Continuation of application No. 14/300,716, filed on Jun. 10, 2014, now Pat. No. 9,015,814.

(51) Int. Cl.
*G06F 21/56* (2013.01)
*G06F 21/51* (2013.01)

(52) U.S. Cl.
CPC .............. *G06F 21/51* (2013.01); *G06F 21/561* (2013.01); *G06F 21/562* (2013.01); *G06F 21/564* (2013.01); *G06F 21/566* (2013.01); *G06F 2221/033* (2013.01)

(58) Field of Classification Search
CPC ........ G06F 21/56; G06F 21/566; G06F 21/53
See application file for complete search history.

(56) References Cited

U.S. PATENT DOCUMENTS

| 7,530,106 | B1 | 5/2009 | Zaitsev et al. | |
| 7,568,233 | B1* | 7/2009 | Szor | G06F 21/564 726/22 |
| 7,854,004 | B2 | 12/2010 | van der Made | |
| 8,196,205 | B2 | 6/2012 | Gribble et al. | |
| 8,464,345 | B2 | 6/2013 | Satish et al. | |
| 8,479,276 | B1 | 7/2013 | Vaystikh et al. | |
| 2003/0074573 | A1* | 4/2003 | Hursey | G06F 21/564 726/22 |
| 2005/0268338 | A1* | 12/2005 | Made | G06F 21/562 726/24 |
| 2011/0247072 | A1 | 10/2011 | Staniford et al. | |
| 2012/0017275 | A1 | 1/2012 | Harmonen | |
| 2013/0145466 | A1 | 6/2013 | Richard et al. | |
| 2013/0160127 | A1 | 6/2013 | Jeong et al. | |

(Continued)

FOREIGN PATENT DOCUMENTS

RU    2486588 C1    6/2013

*Primary Examiner* — Jason K Gee
(74) *Attorney, Agent, or Firm* — Arent Fox LLP; Michael Fainberg (57) ABSTRACT

Disclosed are systems, methods and computer program products for detection of harmful files of different formats. An example method includes: receiving a suspicious file; determining a file format of the suspicious file; determining, using antivirus software, if the suspicious file is clean or harmful; and when the antivirus software fails to determine whether the suspicious file is clean or harmful, selecting, based on at least the file format of the suspicious file, a configuration of a virtual machine for analyzing a maliciousness of the suspicious file by at least: selecting a program associated with the file format of the suspicious file, opening the suspicious file using the associated program in the virtual machine, collecting data of at least one activity on the virtual machine, and analyzing the data to determine the maliciousness of the suspicious file.

20 Claims, 5 Drawing Sheets

(56) References Cited

U.S. PATENT DOCUMENTS

| | | |
|---|---|---|
| 2013/0291109 A1 | 10/2013 | Staniford et al. |
| 2013/0305373 A1 | 11/2013 | Lim et al. |
| 2014/0130158 A1 | 5/2014 | Wang et al. |
| 2014/0137255 A1* | 5/2014 | Wang .................... G06F 21/566 726/24 |
| 2015/0007312 A1* | 1/2015 | Pidathala .............. H04L 63/145 726/22 |

* cited by examiner

Fig. 5

SYSTEM AND METHODS FOR DETECTING HARMFUL FILES OF DIFFERENT FORMATS IN VIRTUAL ENVIRONMENTS

CROSS-REFERENCE TO RELATED APPLICATIONS

This application is a continuation of U.S. patent application Ser. No. 14/300,716 filed on Jun. 10, 2014, which is incorporated by reference herein.

FIELD OF TECHNOLOGY

The present disclosure relates to antivirus technologies, and more specifically, to systems and methods for detecting harmful files of different formats.

BACKGROUND

Harmful programs, known as malware, are becoming increasingly common and infect computers of users in various ways. Some malware, such as the Trojan programs, are generally camouflaged as harmless or useful programs so that the user will download them onto his computer. Viruses and worms have the ability of self-copying, which can result in rapid spread of malware in the event that there is no antivirus software on the computers.

Until recently, the overwhelming majority of harmful programs have been executable files, that is, they contained machine code, but could also contain pseudocode, such as byte code or instructions whereof the execution needed an interpreter. An example of an executable file format is the EXE or COFF format. However, files of other types are now becoming increasingly more common, such as PDF or SWF. This is due to the fact that individual programs are used to open such files (such as Adobe Reader), and the format of such files is itself a kind of container with resources that are used by the program which opens such a file. Often the resource can be either a malicious URL or a script (such as JavaScript).

Figure 1:
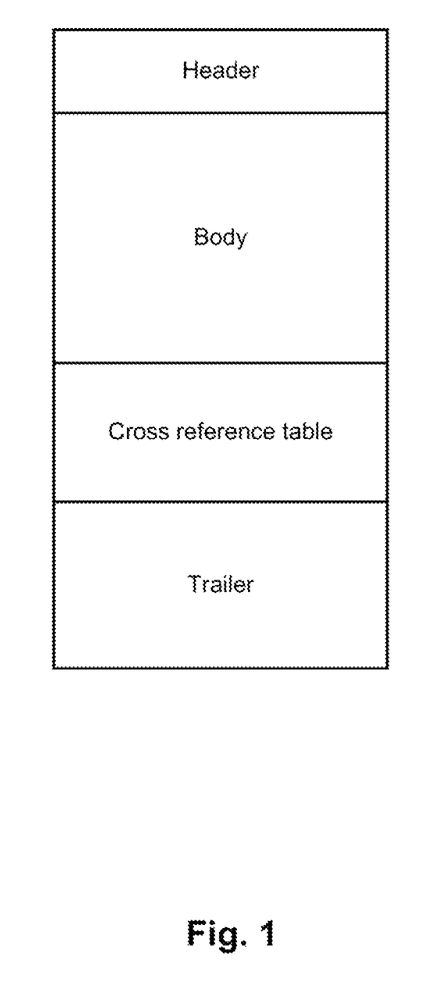
FIG. 1 shows the structure of a PDF file.

FIG. 1 shows the structure of a PDF document that includes four sectors: a header, a body, a table of cross references, and also a trailer. In a general case, a PDF document can be represented as a hierarchy of objects (pages, images, scripts) which are stored in the body of the file, while the table of cross references contains information about these objects. Today it is possible to insert in the file body not just text, but also script, including malicious one. Furthermore, popular programs working with PDF (Acrobat Reader itself) continue to have many vulnerabilities, and a document can be structured in such way that, when opened, it becomes possible to utilize vulnerability using exploit and initiate an execution of malicious payload.

The existing methods of detecting harmful files are ineffective and in some instances impossible to use for analyzing files of different formats.

SUMMARY

Disclosed are example aspects of system, methods and computer program products for detecting harmful files of different formats.

In one aspect, an example method includes: receiving a suspicious file; determining a file format of the suspicious file; determining, using antivirus software, if the suspicious file is clean or harmful; and when the antivirus software fails to determine whether the suspicious file is clean or harmful, selecting, based on at least the file format of the suspicious file, a configuration of a virtual machine for analyzing a maliciousness of the suspicious file by at least: selecting a program associated with the file format of the suspicious file, opening the suspicious file using the associated program in the virtual machine, collecting data of at least one activity on the virtual machine, and analyzing the data to determine the maliciousness of the suspicious file.

In one example aspect, analyzing the maliciousness of the suspicious file by the virtual machine with the selected configuration comprises selecting a signature database corresponding to the file format of the suspicious file or performing a heuristic analysis based on the file format of the suspicious file.

In one example aspect, when the suspicious file is determined to be harmful by the virtual machine, the method further includes creating a signature for the suspicious file and updating a collection of harmful files.

In one example aspect, the virtual machine is configured to analyze the maliciousness of the suspicious file with at least one of: less time, different analysis settings, or a different malware database, than the antivirus software.

In one example aspect, the collection of harmful files are chronologically arranged in a tree structure for tracking a signature and features of each harmful file chronologically.

In one example aspect, the method further includes providing a plurality of virtual machines to analyze a plurality of suspicion files with different formats; and configuring a master machine for the plurality of virtual machines to allocate malware analysis tasks.

In one example aspect, the at least one activity on the virtual machine comprises at least one of registering system application programming interface (API) calls, or recording a memory dump of a process opening the suspicious file.

In one example aspect, a system for analyzing suspicious files in different formats, the system comprising: a hardware processor configured to: receive a suspicious file; determine a file format of the suspicious file; determine, using antivirus software, if the suspicious file is clean or harmful; and when the antivirus software fails to determine whether the suspicious file is clean or harmful, select, based on at least the file format of the suspicious file, a configuration of a virtual machine for analyzing a maliciousness of the suspicious file by at least: selecting a program associated with the file format of the suspicious file, opening the suspicious file using the associated program in the virtual machine, collecting data of at least one activity on the virtual machine, and analyzing the data to determine the maliciousness of the suspicious file.

In one example aspect, a non-transitory computer-readable storage medium, storing a computer program product thereon for analyzing suspicious files in different formats, comprises computer-executable instructions for: receiving a suspicious file; determining a the format of the suspicious file; determining, using antivirus software, if the suspicious file is clean or harmful; and when the antivirus software fails to determine whether the suspicious file is clean or harmful, selecting, based on at least the file format of the suspicious file, a configuration of a virtual machine for analyzing a maliciousness of the suspicious file by at least: selecting a program associated with the file format of the suspicious file, opening the suspicious file using the associated program in the virtual machine, collecting data of at least one activity on the virtual machine, and analyzing the data to determine the maliciousness of the suspicious file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for detecting harmful files of different formats. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 2:
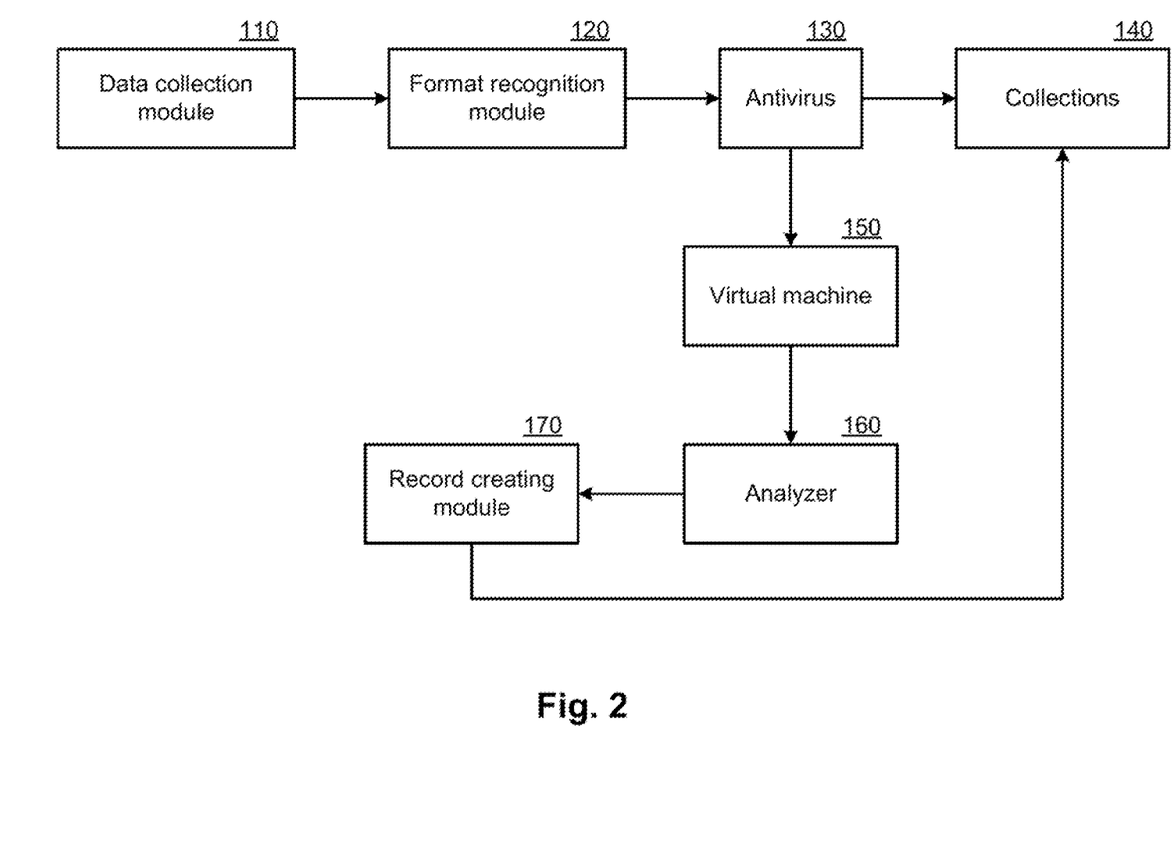
FIG. 2 shows a diagram of an example system for detecting harmful files of different formats according to one example aspect.

FIG. 2 shows a diagram of a system for detecting harmful files of different formats according to one example aspect. The system includes a data collection module 110 that collects suspicious files. The module 110 may collect suspicious files from different sources: for example, a virustotal service (https://www.virustotal.com/), which is an online service that analyzes suspicious files and URLs and facilitates detection of viruses, worms, Trojans, and other kinds of malware, the computers of users, various honeypots, and also unknown files can be sent in by users themselves via email or other means (such as via FTP).

Unknown suspicious files can be automatically collected from users' computers and other sources by an antivirus application, which can identify suspicious files using different ways, which may include, but not limited to:
  checking of a file in an antivirus databases did not reveal the file to be harmful, but even so the file may have a certain danger rating. An example of the calculation of such a rating is given in the commonly owned U.S. Pat. No. 7,530,106, which is incorporated by reference herein;
  the file was obtained from a suspicious (untrusted) source and placed in quarantine;
  the file includes embedded links or scripts (such as JavaScript);
  when the file is opened, an untrusted program is started.

After this, a format recognition module 120 determines the format of the suspicious file. The format determination can be done using known methods, such as those disclosed in the US patent application publication no 2009/0013408, which is incorporated by referenced herein. For example, the format determination can be based on an analysis of the header: the GIF header includes the bytes "GIF", an executable file includes the entry "MZ", and a file of OLE format includes the set of bytes "0xD0 0xCF". The file format can also be identified on the basis of the byte entropy value.

After the format of the file has been determined, the file is sent for analysis to the antivirus 130, which checks the file using one or more of the following malware analysis methods: signature matching, heuristic analysis, use of databases of third-party manufacturers of antivirus products, and other known methods. The distinction between an antivirus analysis using the antivirus 130 and an antivirus analysis which can be performed on the user's computer generally is in the amount of time which can be spent on the analysis, and also the analysis settings (for example, a deeper heuristic check) and the use of enlarged antivirus databases not available directly to the user (due to large size of such antivirus databases, for example). In one example aspect, the antivirus analysis can be customized for a certain file format in order to maximize efficiency of the antivirus analysis, for example, by selecting a corresponding signature database or by setting up the heuristic analyzer for the analyzed files format.

In the event that the antivirus 130 has determined an unknown file to be a known harmful or clean file, it will update or modify the local databases in terms of the known harmful/clean files of the given format (the collections 140). The database modification may be based on an update of the analysis methods such that a file which was formerly not determined to be harmful is now determined to be such. In future, this file will be screened out from the antivirus analysis (for example, by the hash sum value) in order to avoid needless checking.

If the antivirus 130 has not determined the unknown file to be harmful, it goes to a virtual machine 150. The virtual machine can be implemented using any known methods of implementation, for example, using VirtualBox/QEMU, Virtual PC or the WMware Workstation. In one example aspect, different configurations of virtual machines may be selected for analysis of different file formats. For example, for analysis of a PDF file, a custom virtual machine may be configured to run one or more different versions of Adobe Reader (although other programs for opening PDF files may be used, such as Foxit Reader).

The images of the virtual machines may have different configurations, e.g., they may run different software for opening files of different formats: for example, one custom virtual machine may run a Windows OS, Microsoft Office, and a Internet Explorer browser, which can be used for opening Word files in Windows operating environment; a different custom virtual machine may run an Android OS, and Adobe Reader and Chrome browser for opening PDF files in Android operating environment. In one example aspect, the virtual machines themselves may include a master machine, which allocates malware analysis tasks, and the antivirus checking machines themselves, on which the analysis of the suspicious files takes place.

In one example aspect, the analysis of a suspicious file in the virtual machine 150 may include opening the file using an associated program running on the virtual machine 150 (e.g., Adobe Reader may be used to open PDF files). After the file has been opened, actions relating to the user's activity may be performed (e.g., simulated) in the virtual machine 150, such as consent to initialize a script or action (e.g., to automatically perform the user's actions, such as pressing the keyboard keys or clicking on URL links) or another user action.

After the suspicious file has been opened, data may be collected that relates to the activity on the virtual machine 150, such system API calls (for the Windows OS, these will generally be Win32 API calls) may be registered, and the memory dump of the process opening the file may be recorded (for a PDF file this may be the dump of the Adobe Reader process memory). The termination of the working of the virtual machine 150 may be limited in time or may be based on the activity which is recorded for example, file activity or depending on the results of the utilization activity of the basic resources such as the CPU).

After the suspicious file has been opened in the virtual machine 150, an analyzer 160 may perform an analysis of the collected data. An example of an analysis is given below:

Example No. 1

```
$signature adobe_signature( '<PROCESS_INFO>"C:\\Program
Files\\Adobe\\Reader 9.0\\Reader\\AcroRd32.exe" ,GENERIC);
$signature url_signature1("URLDownloadToFile' ?? '(' ,GENERIC);
$signature url_signature2( 'URLDownloadToCacheFile'
?? '(' ,GENERIC);
$signature url_signature3( 'InternetOpenUrl' ?? '(' ,GENERIC);
$signature exec_signature( 'WinExec (' ,GENERIC);
$signature exec_signature2( 'ShellExecute' ?? '(' ,GENERIC);
$signature exec_signature3( 'ShellExecuteEx' ?? '(' ,GENERIC);
$signature exec_signature4( 'CreateProcess' ?? '(' ,GENERIC);
bool stop;
$on ( adobe_signature
    && (url_signature1  ||  url_signature2  ||  url_signature3  ||
exec_signature   ||exec_signature2 || exec_signature3 ||
exec_signature4)
    && (stop == false)
  )
{
    stop = true;
    $verdict("Test.Exploit.PDF");
}
```

The above example shows that a triggering of the signature occurs when a series of actions are performed during the opening of the PDF file, such as when the file is downloaded from a URL address, starting of a process or a command prompt.

If the analyzer 160 has found a harmful functionality in an unknown file, a record creating module 170 may create a signature for the detection of this file in future. The signature may be a set of characteristic bytes from different parts of the file which enables a unique identification of the harmful file. A signature generally includes one of the following fields (or parts thereof):
   a header, including the version of the PDF document;
   the number of records on the objects in the document;
   the linearized attribute (a specialized type of PDF formatting suitable for viewing on the Internet);
   a portion of the able of cross references;
   certain unique objects of the document itself or a portion thereof (for example, a unique part of the script which is characteristic of a whole series of harmful files).

Figure 3:
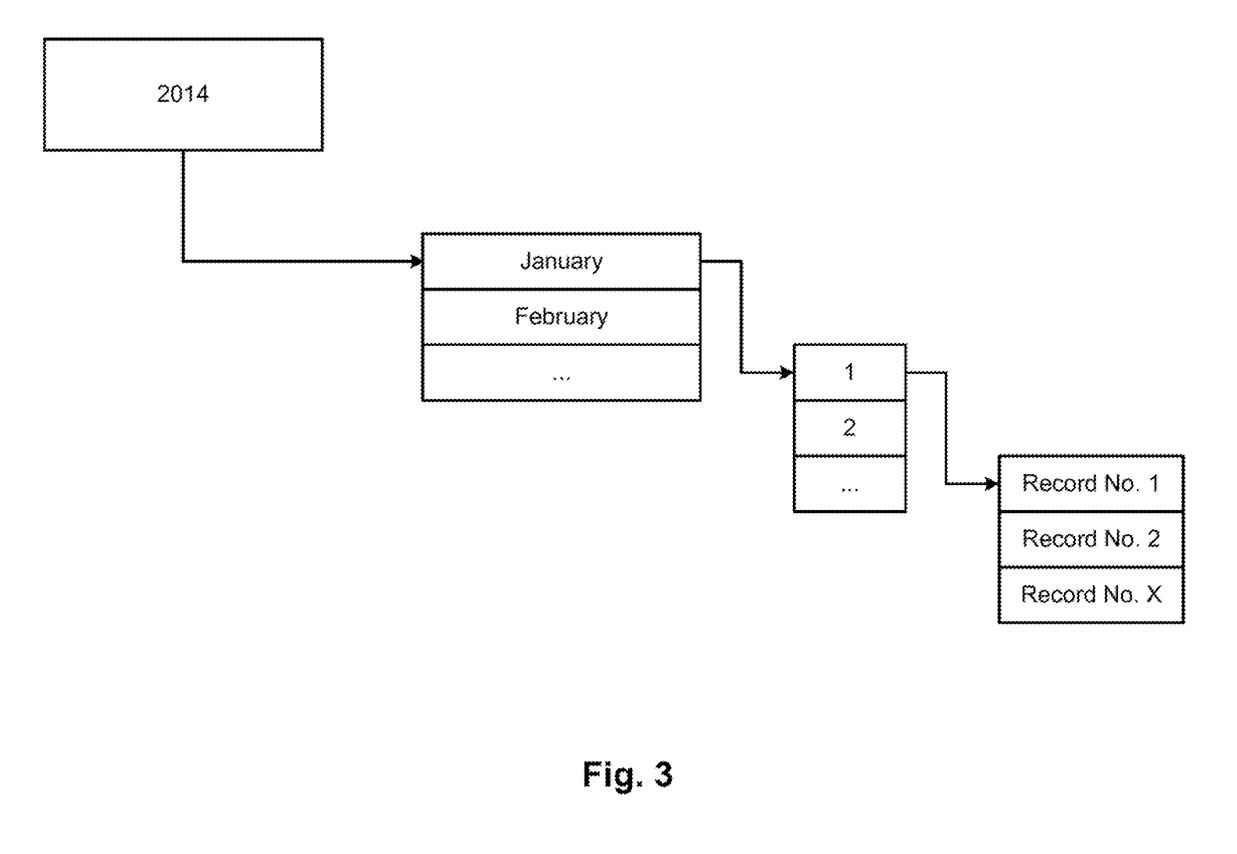
FIG. 3 shows an example structure for storing signatures in a database.

In one example aspect, a tree structure of file signatures can also be used to detect harmful files. The tree may be constructed on the basis of the date (year-month- . . . ). FIG. 3 shows an example tree structure for storing signatures of harmful files in a database. The root catalogues are the years, followed by the months and then the days, which in turn include the corresponding signatures. Such a structure enables an easy navigation through the signature database and tracking of the history of appearance of new harmful files and their features.

Figure 4:
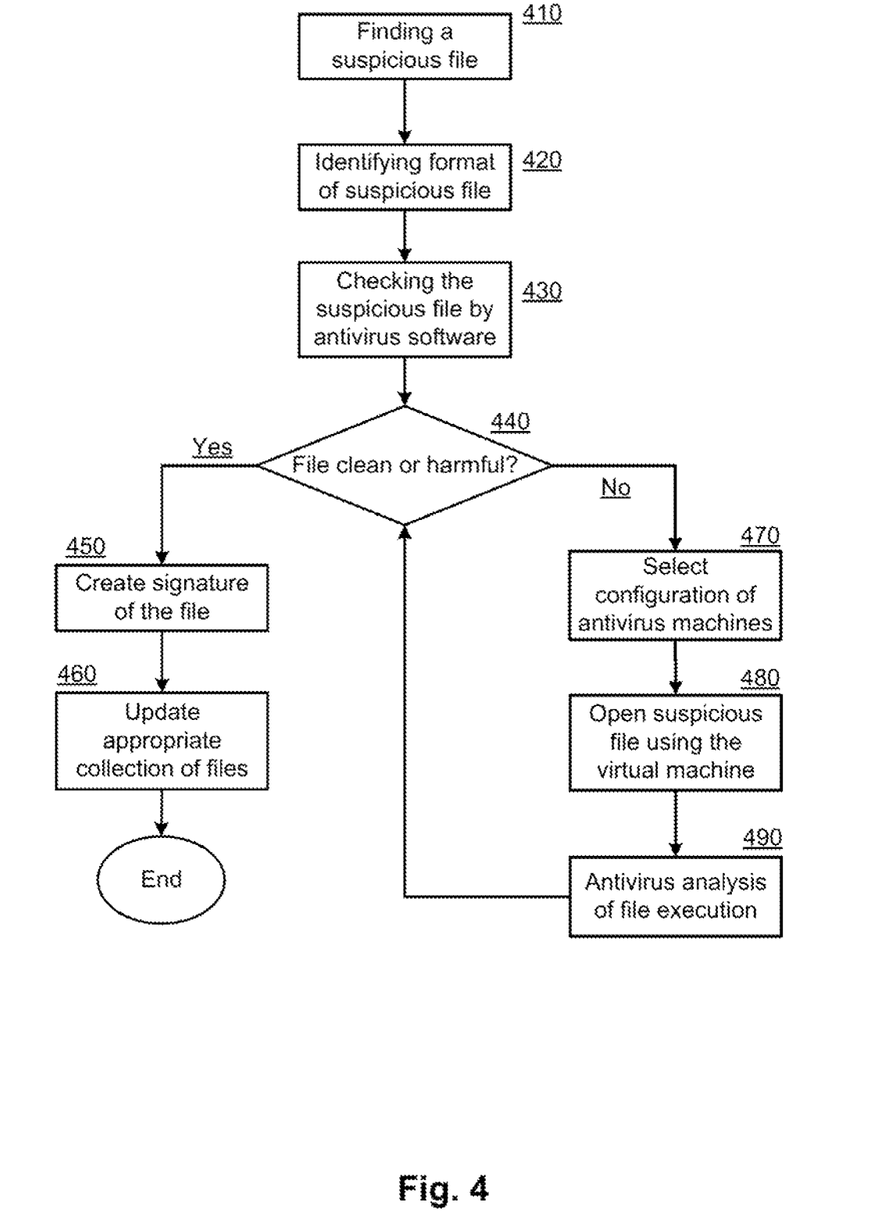
FIG. 4 illustrates a flow diagram of an example method for detecting harmful files of different formats according to one example aspect.

FIG. 4 illustrates an example method for detecting harmful files of different formats according to one example aspect. In step 410, the system finds a suspicious file via various file sources: the service virustotal, the users' computers, various honeypots, and unknown files submitted by users using email or other means. Next, in step 420, the system identifies format of the suspicious file, and, in step 430, analyzes the suspicious file using antivirus software with, preferably, the latest version of antivirus databases. If in step 440 the suspicious file is determined to be clean or harmful, then in step 450 the system may create a signature of the file, and at step 460 update the collection of clean files or collection of harmful files based on the antivirus verdict. Otherwise, in step 470, the system selects an appropriate configuration of an antivirus machine based on the format of the file. In step 480, the system opens and/or executes the file in the virtual machine 150. After this, in step 490, the system performs an antivirus analysis of the events of file execution in the virtual machine 150, and repeats the sequence of steps 440 to 460, after which processing of the suspicious file ends.

In one example aspect, in order to avoid false positives, the system can collect various popular (e.g., frequently used) files of different formats. Examples of such files are various user manuals for popular products (e.g., software) or press releases in PDF format. The files with the highest frequency of occurrence may be designated as a suspicious file, after which they undergo the antivirus analysis in steps 430-440 and added to the collection of clean files.

Figure 5:
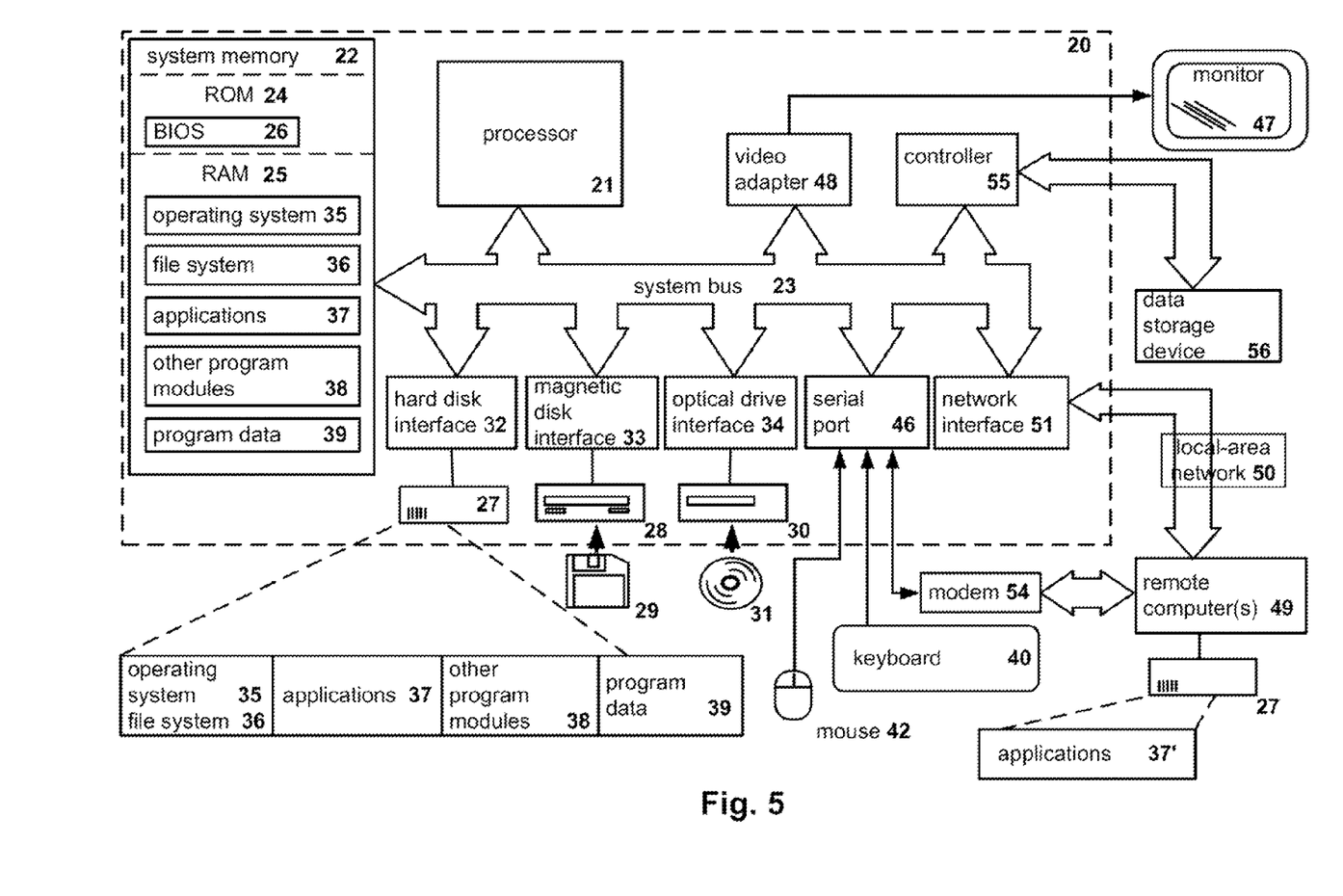
FIG. 5 shows an example of a general-purpose computer system which may be used to implement disclosed aspects of systems and methods for detecting harmful files of different formats.

FIG. 5 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable; magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 8. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein, it will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for analyzing suspicious files in different formats, the method comprising:
   providing a plurality of virtual machines configured to analyze a plurality of suspicious files with different formats and a master virtual machine configured to allocate malware analysis tasks to the plurality of virtual machines;
   determining, using an antivirus software, if a suspicious file is clean or harmful; and
   when the antivirus software fails to determine whether the suspicious file is clean or harmful:
   allocating, by the master virtual machine, based on at least a file format of the suspicious file, the suspicious file to a virtual machine selected from the plurality of virtual machines for a malware analysis;
   opening the suspicious file using a file format associated program in the selected virtual machine;
   collecting data of at least one activity on the virtual machine, wherein the data comprises information about at least one of an application programming interface (API) call and/or memory associated with a process opening the suspicious file; and
   determining, by the virtual machine, the maliciousness of the suspicious file by analyzing the data using a signature database containing signatures specific to the file format of the suspicious file, and/or by performing a heuristic analysis using at least one file format specific heuristic algorithm.

2. The method of claim 1, further comprising a step of generating a signature associated with the suspicious file when the suspicious file is determined to be malicious,
wherein the signature includes a set of characteristic bytes from different parts of the suspicious file that enable identification of the suspicious file.

3. The method of claim 2, further comprising:
when the suspicious file is determined to be harmful by the virtual machine, updating a collection of harmful files with the signature.

4. The method of claim 1, wherein the signature database used by the virtual machine selected to analyze the maliciousness of the suspicious file is larger than a second signature database used by the antivirus software when determining whether the file is clean or harmful.

5. The method of claim 3, wherein the collection of harmful files is chronologically arranged in a tree structure for tracking a signature and features of each harmful file chronologically.

6. The method of claim 1, wherein the collecting step comprises:
executing the suspicious file; and
performing, by the virtual machine, an activity that simulates a user activity comprising at least one of simulating user input and/or user interaction with the executed suspicious file.

7. The method of claim 2, wherein the set of characteristic bytes from different parts of the file comprises bytes from at least two fields in the file selected from the group consisting of: a header of the file, a linearized attribute of the file, and a portion of a table of cross references of the file.

8. A system for analyzing suspicious files in different formats, the system comprising:
a hardware processor configured to:
provide a plurality of virtual machines configured to analyze a plurality of suspicious files with different formats and a master virtual machine configured to allocate malware analysis tasks to the plurality of virtual machines;
determine, using an antivirus software, if a suspicious file is clean or harmful; and
when the antivirus software fails to determine whether the suspicious file is clean or harmful:
allocate, by the master virtual machine, based on at least a file format of the suspicious file, the suspicious file to a virtual machine selected from the plurality of virtual machines for a malware analysis;
open the suspicious file using a file format associated program in the selected virtual machine;
collect data of at least one activity on the virtual machine, wherein the data comprises information about at least one of an application programming interface (API) call and/or memory associated with a process opening the suspicious file; and
determine, by the virtual machine, the maliciousness of the suspicious file by analyzing the data using a signature database containing signatures specific to the file format of the suspicious file, and/or by performing a heuristic analysis using at least one file format specific heuristic algorithm.

9. The system of claim 8, wherein the processor is further configured to generate a signature associated with the suspicious file when the suspicious file is determined to be malicious,
wherein the signature includes a set of characteristic bytes from different parts of the suspicious file that enable identification of the suspicious file.

10. The system of claim 9, wherein the processor is further configured to update a collection of harmful files with the signature when the suspicious file is determined to be harmful by the virtual machine.

11. The system of claim 8, wherein the signature database used by the virtual machine selected to analyze the maliciousness of the suspicious file is larger than a second signature database used by the antivirus software when determining whether the file is clean or harmful.

12. The system of claim 10, wherein the collection of harmful files is chronologically arranged in a tree structure for tracking a signature and features of each harmful file chronologically.

13. The system of claim 8, wherein the processor is further configured to:
collect data of at least one activity on the virtual machine by executing the suspicious file; and
perform, by the virtual machine, an activity that simulates a user activity comprising at least one of simulating user input and/or user interaction with the executed suspicious file.

14. The system of claim 9, wherein the set of characteristic bytes from different parts of the file comprises bytes from at least two fields in the file selected from the group consisting of: a header of the file, a linearized attribute of the file, and a portion of a table of cross references of the file.

15. A non-transitory computer-readable storage medium storing a computer program product thereon for analyzing suspicious files in different formats, the computer program product comprising computer-executable instructions for:
providing a plurality of virtual machines configured to analyze a plurality of suspicious files with different formats and a master virtual machine configured to allocate malware analysis tasks to the plurality of virtual machines;
determining, using an antivirus software, if a suspicious file is clean or harmful; and
when the antivirus software fails to determine whether the suspicious file is clean or harmful:
allocating, by the master virtual machine, based on at least a file format of the suspicious file, the suspicious file to a virtual machine selected from the plurality of virtual machines for a malware analysis opening the suspicious file using a file format associated program in the selected virtual machine;
collecting data of at least one activity on the virtual machine, wherein the data comprises information about at least one of an application programming interface (API) call and/or memory associated with a process opening the suspicious file; and
determining, by the virtual machine, the maliciousness of the suspicious file by analyzing the data using a signature database containing signatures specific to the file format of the suspicious file, and/or by performing a heuristic analysis using at least one file format specific heuristic algorithm.

16. The computer-readable storage medium of claim 15, further comprising instructions for generating a signature associated with the suspicious file when the suspicious file is determined to be malicious,
wherein the signature includes a set of characteristic bytes from different parts of the suspicious file that enable identification of the suspicious file.

17. The computer-readable storage medium of claim 16, further comprising instructions for:
> when the suspicious file is determined to be harmful by the virtual machine, updating a collection of harmful files with the signature, wherein the collection of harmful files is chronologically arranged in a tree structure for tracking a signature and features of each harmful file chronologically.

18. The computer-readable storage medium of claim 15, wherein the signature database used by the virtual machine selected to analyze the maliciousness of the suspicious file is larger than a second signature database used by the antivirus software when determining whether the file is clean or harmful.

19. The computer-readable storage medium of claim 15, wherein the instructions for collecting data of at least one activity on the virtual machine further comprise instructions for:
> executing the suspicious file; and
> performing, by the virtual machine, an activity that simulates a user activity comprising at least one of simulating user input and/or user interaction with the executed suspicious file.

20. The computer-readable storage medium of claim 16, wherein the set of characteristic bytes from different parts of the file comprises bytes from at least two fields in the file selected from the group consisting of: a header of the file, a linearized attribute of the file, and a portion of a table of cross references of the file.

\* \* \* \* \*